United States Patent [19]

Beauchemin

[11] Patent Number: 5,427,344
[45] Date of Patent: Jun. 27, 1995

[54] PORTABLE HANGING SHELF FOR ATTACHMENT TO VERTICAL OBJECTS

[76] Inventor: David G. Beauchemin, 1312 W. Bell, Houston, Tex. 77019

[21] Appl. No.: 225,652

[22] Filed: Apr. 11, 1994

Related U.S. Application Data

[63] Continuation-in-part of Ser. No. 954,388, Sep. 30, 1992, Pat. No. 5,301,911.

[51] Int. Cl.$^6$ .............................................. A47F 5/00
[52] U.S. Cl. .................................. 248/218.4; 108/149; 108/152; 182/150; 182/187; 182/206; 248/235
[58] Field of Search ............... 248/218.4, 219.1, 219.2, 248/231, 231.1, 227, 322, 235; 224/252, 253, 218; 108/152, 149; 182/92, 187, 150, 206

[56] References Cited

U.S. PATENT DOCUMENTS

| | | | |
|---|---|---|---|
| 5,052,648 | 10/1991 | Landau | 248/235 |
| 5,301,911 | 4/1994 | Beauchemin | 248/218.4 |
| 5,310,019 | 5/1994 | Paul | 182/187 |

Primary Examiner—Ramon O. Ramirez
Attorney, Agent, or Firm—Kenneth A. Roddy

[57] ABSTRACT

A portable hanging shelf system is disclosed wherein one or more shelves are suspended in a horizontal position from generally vertical objects of varying diameter. A non-elastic flexible fabric belt encircles generally vertical objects of varying diameters, such as a tree trunk, and an adjustable lever-type buckle on the belt releasably grips and applies tension in the encircled portion of the belt to firmly secure a pair of brackets to the curved surface of the vertical object. A cord is connected to each bracket and forms a loop which receives one or more flat rectangular shelves. The cords pass through slots at the opposed ends of each shelf and the shelves are secured in an adjustable horizontal position at the desired height above the ground by a cord lock or by passing the cord through additional slots. Because the top ends of the cords are very close to the vertical object, when weight is placed on the shelf, the center of gravity of the shelf is spaced horizontally outward from its point of suspension and the resultant weight force causes the shelf to press firmly inward against the vertical object. All the components can be stored in a compact configuration and are easily transported in a backpack. The portable shelf system eliminates the need for nails or screws to be driven into trees and is particularly useful for campers and backpackers.

16 Claims, 7 Drawing Sheets

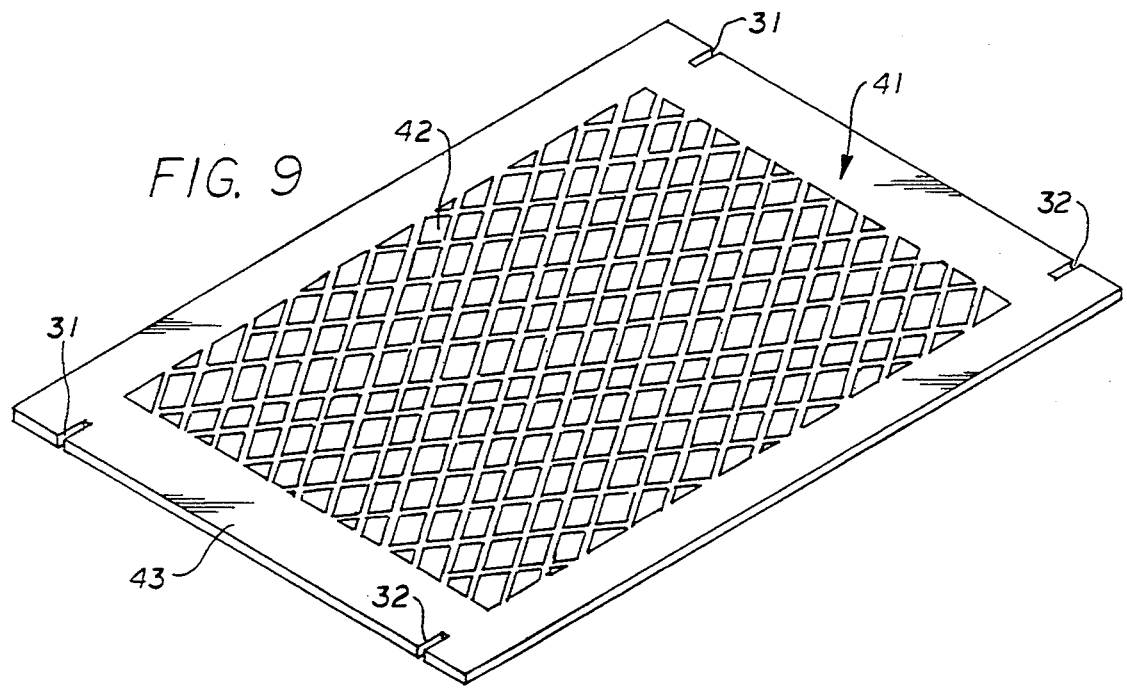
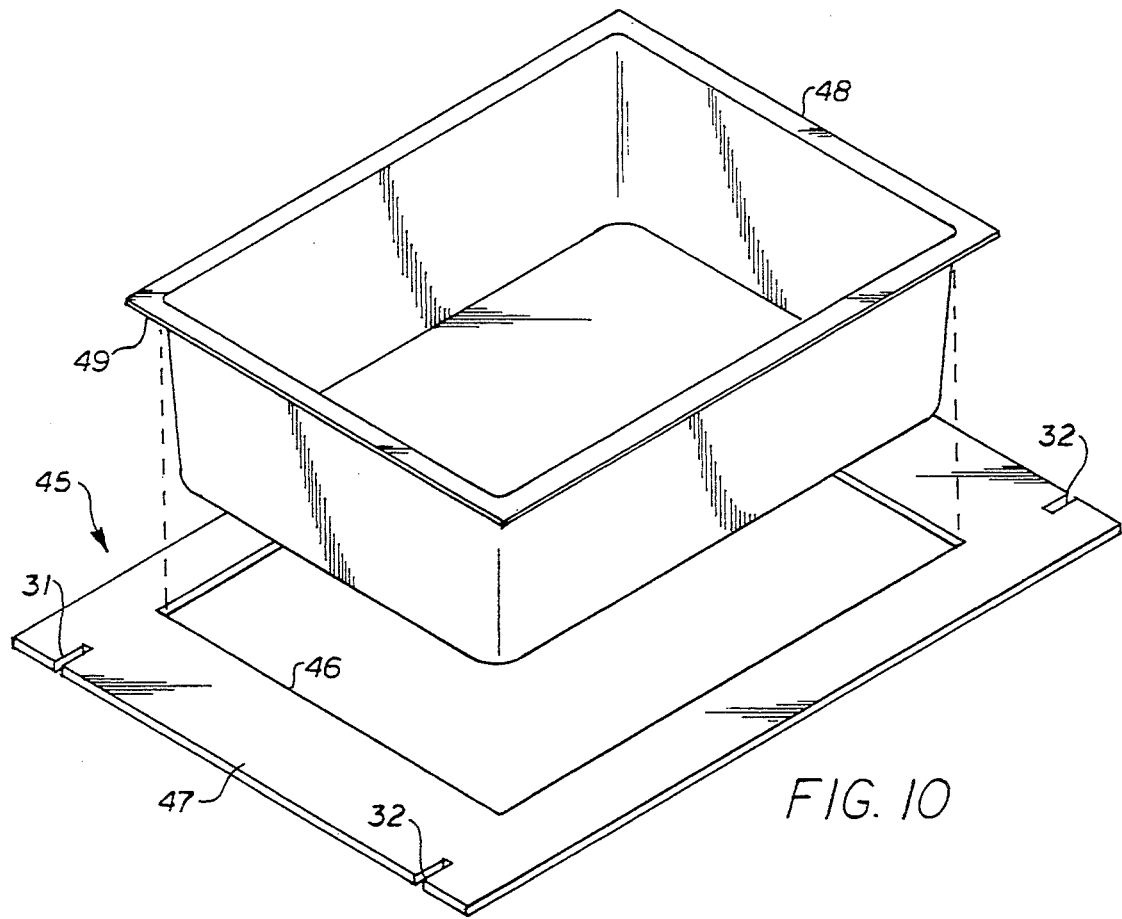

PORTABLE HANGING SHELF FOR ATTACHMENT TO VERTICAL OBJECTS

CROSS-REFERENCE TO RELATED APPLICATION

This application is a continuation-in-part of U.S. patent application Ser. No. 07/954,388, now U.S. Pat. No. 5,301,911.

BACKGROUND OF THE INVENTION

1. Field of the Invention

This invention relates generally to hanging devices, and more particularly to a portable hanging shelf which is suspended in a horizontal position from generally vertical objects of varying diameter, such as a tree trunk, by a pair of cords attached to a pair of brackets removably secured to the object by a non-elastic flexible fabric belt which encircles the object and is fastened by an adjustable lever-type buckle.

2. Brief Description of the Prior Art

A common problem when camping, backpacking, or picnicing out of doors, is that there is no convenient level surface for placing articles associated with such endeavors. It is often desirable when cooking to have a level surface on which to place the stove or various cooking utensils, or when shaving, to have a level surface at a convenient height for holding a pan of water, shaving articles, and a mirror. On other occasions, it is desirable to have a level surface for storing articles above the ground to prevent animals from gaining access to them.

Usually, if a picnic table is available, the table top serves as the storage area and quickly becomes cluttered with various items, thus, it would be desirable to provide an auxiliary storage shelf to keep items in a convenient easy to reach location and prevent clutter around the campsite and table.

In the absence of a convenient storage surface, many campers will drive a nail into a tree to hang articles, such as lanterns and water bags which causes harm to the tree and is a safety hazard to other campers unaware of the nail sticking out of the tree.

Thus, a longfelt need exists for a portable hanging shelf that can be carried in a compact stored condition, such as a backpack, and is quickly and easily installed on a tree trunk or other vertical object to allow a wide variety of articles to be suspended and supported above the ground on a level surface.

There are several patents which disclose various hanging devices which encircle a vertical member and support other objects.

Fischett, U.S. Pat. No. 3,009,612 discloses a fishing harness which is strapped around the waist of the user and has a socket or cup for bracing a fishing rod to relieve strain while fishing.

Cucullo, U.S. Pat. No. 3,164,343 discloses a gravestone flower support which utilizes a metal band having its longitudinal edges bent over to form longitudinal beads along the top and bottom longitudinal edges and provide a guide for an adjacent band portion, likewise having its longitudinal edges bent over to form complementary beads. A toothed portion of the metal band interlocks with the beaded portion such that they cannot be released from each other. A metal wreath support and a metal conical flower receptacle have U-shaped bends at the rear portions for supporting them on the metal band.

Humphery, U.S. Pat. No. 4,674,597 discloses a series of wedge-like housings containing a reel and retractable cable which are attached by the cable to a tree and serve as steps to allow a person to climb a tree. The retractable cable is pulled outwardly to encircle the tree and the outer end of the cable has a latching block which is inserted into a latching slot having a narrow groove which retains the latching block as the spring loaded reel takes the slack out of the cable.

O'Neill, U.S. Pat. No. 4,523,526 discloses a hanging shelf assembly having a pair of webbing straps which are secured to a wall by a wall fastener and are formed in an endless loop and pass through slots in the shelves.

Buckley, U.S. Pat. No. 4,744,537 discloses a sling and bracket type hanging device which can be mounted on a tree. The device utilizes a vertical bracket formed of V-shaped angle iron which is secured vertically to a tree trunk by an elastic band that encircles the trunk at the lower end of the bracket. An elongate horizontal support affixed to the medial portion of the vertical angle bracket extends horizontally outward therefrom and is supported by a rope sling which is looped around the tree trunk above the elastic band and its attached at its free end to the medial portion of the horizontal support arm.

Landau, U.S. Pat. No. 5,052,648 discloses a suspension cable shelf mounting system which utilizes crimped eyelets at the ends of the cable through which receive a wall fastener and bracket members having channel sections with gripping jaws which grip the top and bottom surfaces of the shelf.

Lamprey, U.S. Pat. No. 5,156,096 discloses an anti-rotational outdoor shelf which is supported on triangular legs (brackets) secured to a vertical object by a belt which passes through slots in the legs (brackets) and relies on balanced gravitational forces for support and teaches away from tightly clamping the legs (brackets) against the vertical member.

The present invention is distinguished over the prior art in general, and these patents in particular by a portable hanging shelf system wherein one or more shelves are suspended in a horizontal position from generally vertical objects of varying diameter without nails or screws. A non-elastic flexible fabric belt encircles generally vertical objects of varying diameters, such as a tree trunk, and an adjustable lever-type buckle on the belt releasably grips and applies tension in the encircled portion of the belt to firmly secure a pair of brackets to the curved surface of the vertical object. A cord is connected to each bracket and forms a loop which receives one or more flat rectangular shelves. The cords pass through slots at the opposed ends of each shelf and the shelves are secured in an adjustable horizontal position at the desired height above the ground by a cord lock or by passing the cord through additional slots. Because the top ends of the cords are very close to the vertical object, when weight is placed on the shelf, the center of gravity of the shelf is spaced horizontally outward from its point of suspension and the resultant weight force causes the shelf to press firmly inward against the vertical object. All the components can be stored in a compact configuration and are easily transported in a backpack.

SUMMARY OF THE INVENTION

It is therefore an object of the present invention to provide a portable hanging shelf which can be easily and quickly attached to a vertical object such as a tree trunk to receive and support various articles.

It is another object of this invention to provide a portable hanging shelf which is suspended by a pair of cords attached to a pair of brackets removably secured to a vertical object by a non-elastic flexible fabric belt which encircles the object and is fastened by an adjustable lever-type buckle.

Another object of this invention is to provide a lightweight portable hanging shelf which can be stored in a small compact configuration and is transported.

Another object of this invention is to provide a portable hanging shelf which is suspended by a pair of cords attached to a pair of brackets removably secured to a vertical object by a non-elastic flexible fabric belt which encircles generally vertical objects of varying diameters and is fastened by an adjustable lever-type buckle to releasably grip and apply tension in the encircled portion of the belt and firmly secure the belt in the encircled condition without damage to the surface of the object on which it is attached.

Another object of this invention is to provide a portable hanging shelf which is particularly useful for campers and backpackers for supporting various articles above the ground and is easily carried in a backpack.

Another object of this invention is to provide a portable hanging shelf which is easily adjusted to a horizontal position for supporting various articles on a level surface.

Another object of this invention is to provide a portable hanging shelf which is easily adjusted to a horizontal position at selective heights above the ground for supporting various articles on a level surface.

Another object of this invention is to provide a portable hanging shelf system in which more than one shelf may be suspended from a vertical object in a horizontal position at selective heights above the ground for supporting various articles on several level surfaces.

A further object of this invention is to provide a portable hanging system which will eliminate the need to drive nails into trees and other vertical objects for hanging various articles.

A still further object of this invention is to provide a portable hanging system which is simple in construction, economical to manufacture, and is rugged and reliable in use.

Other objects of the invention will become apparent from time to time throughout the specification and claims as hereinafter related.

The above noted objects and other objects of the invention are accomplished by a portable hanging shelf system wherein one or more shelves are suspended in a horizontal position from generally vertical objects of varying diameter without nails or screws. A non-elastic flexible fabric belt encircles generally vertical objects of varying diameters, such as a tree trunk, and an adjustable lever-type buckle on the belt releasably grips and applies tension in the encircled portion of the belt to firmly secure a pair of brackets to the curved surface of the vertical object. A cord is connected to each bracket and forms a loop which receives one or more flat rectangular shelves. The cords pass through slots at the opposed ends of each shelf and the shelves are secured in an adjustable horizontal position at the desired height above the ground by a cord lock or by passing the cord through additional slots. Because the top ends of the cords are very close to the vertical object, when weight is placed on the shelf, the center of gravity of the shelf is spaced horizontally outward from its point of suspension and the resultant weight force causes the shelf to press firmly inward against the vertical object. All the components can be stored in a compact configuration and are easily transported in a backpack.

BRIEF DESCRIPTION OF THE DRAWINGS

FIG. 9 is an isometric view of an embodiment of a shelf member having an open grid configuration.

FIG. 10 is an isometric view of another embodiment of a shelf member having a central aperture.

DESCRIPTION OF THE PREFERRED EMBODIMENT

Figure 1:
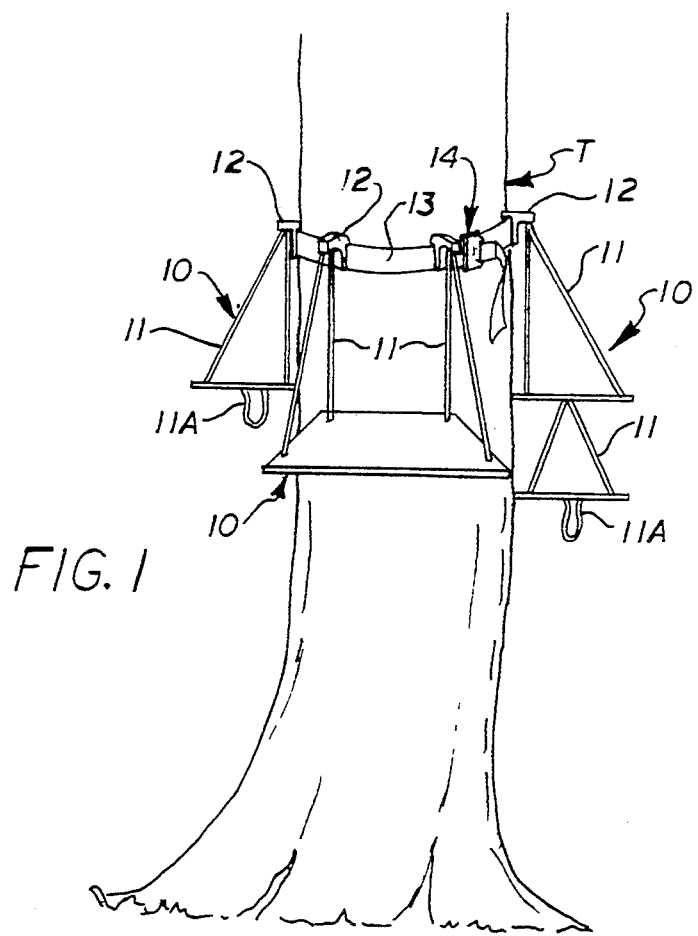
FIG. 1 is a perspective view of a portable hanging shelf in accordance with the present invention shown installed on the trunk of a tree for supporting various articles.

In the following discussion, the portable hanging shelf will be described as being installed on the trunk of a tree, but it should be understood that it can be installed on other types of vertical objects of various diameters. Referring now to FIG. 1, several portable hanging shelf assemblies 10 in accordance with the present invention are shown suspended by a pair of cords 11 attached to a pair of brackets 12 secured to the trunk of a tree T by a non-elastic flexible fabric belt 13 which encircles the tree trunk and is buckled tightly around the trunk by a cam-type buckle 14. The present portable hanging shelves are particularly useful for backpackers, hikers, campers, and various out door activities where it is desirable to have a level surface for holding various articles, such as stoves, food items, water jugs, lanterns, wash basins, etc.

Figure 2:
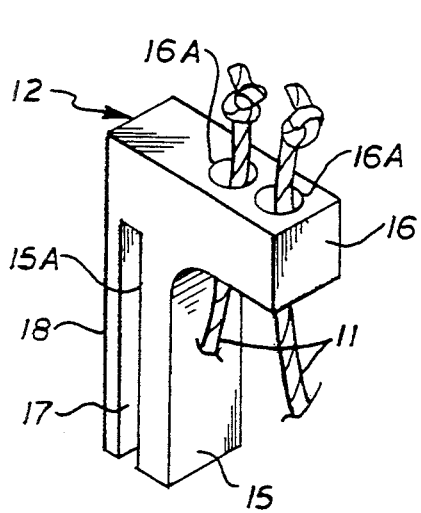
FIG. 2 is an isometric view of a bracket member used to suspend the shelves.

As shown in FIG. 2, each bracket member 12 is an inverted, generally L-shaped member having a rectangular vertical portion 14 and a rectangular upper portion 16 which extends outwardly perpendicular thereto.

The vertical portion 15 has a vertical slot 17 which extends upwardly from the bottom end and terminates near the top surface of the upper end to define a flat rectangular tang 18 spaced parallel to the flat back surface 15A of the vertical portion 15. The length and width of the slot 17 is sufficient to slidably receive the belt 13 (described hereinafter). Each bracket 12 is installed onto the belt after attaching the belt to the tree trunk but prior to fastening the buckle by sliding the slot 17 over the top edge of the belt to capture the tang 18 between the inner surface of the belt and the exterior surface of the tree trunk. The outwardly extending upper portion 16 of each bracket 12 has a pair of vertical counterbored holes 16A extending therethrough to receive the free ends of a length of cord 11 and the remaining portion of the cords form a loop 11A. In the preferred embodiment, the cords 11 are made of nylon and the free ends are knoted to prevent them from being pulled downwardly through the counterbored holes 16A and the tip ends are burnt to melt the nylon material and prevent fraying.

Figure 3:
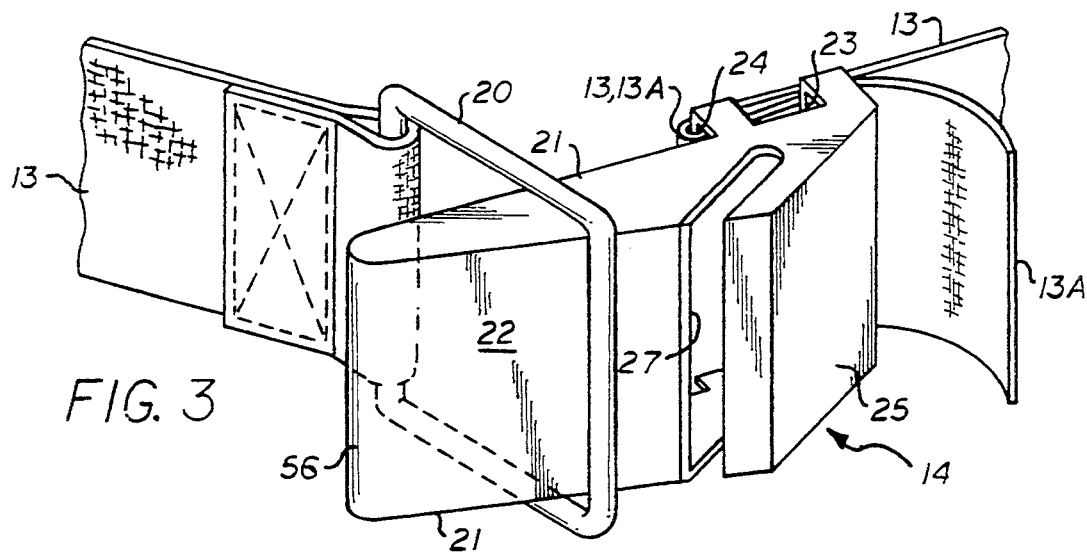
FIG. 3 is a perspective view of a portion of the belt and cam buckle arrangement of the hanging system in an unfastened position.
Figure 4:
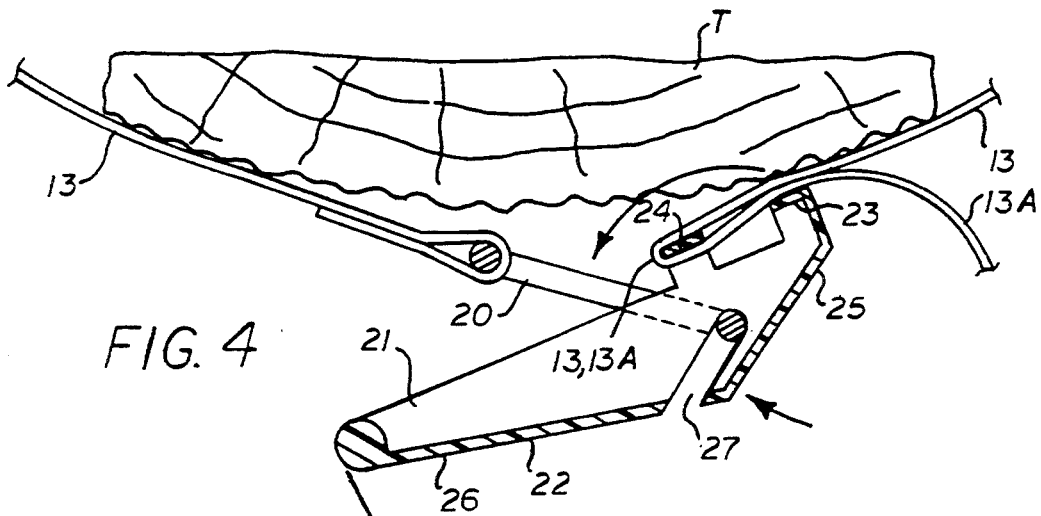
FIG. 4 is a top plan view in cross section of a portion of the belt and cam buckle arrangement showing the buckle being moved to the fastened position.
Figure 5:
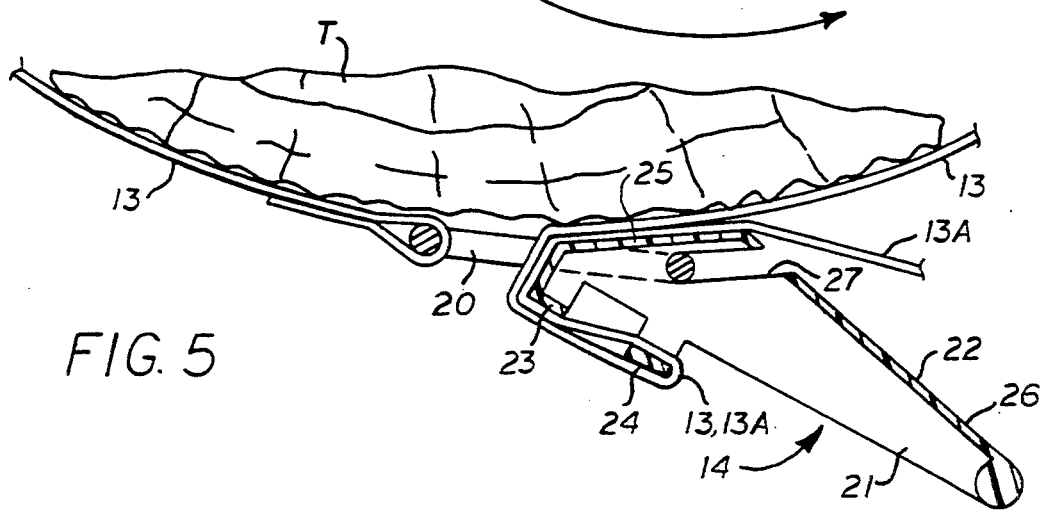
FIG. 5 is a top plan view in cross section of a portion of the belt and cam buckle arrangement showing the buckle in the fastened position.

Referring now to FIGS. 3, 4, and 5, the belt and cam buckle arrangement will be described. The flexible belt 13 is formed of substantially non-elastic flexible fabric material, such as nylon webbing. A loop ring 20 formed of rigid plastic or metal material is secured onto one end of the belt 13 by looping the belt around the ring 20 and stitching it onto itself. The other end of the belt 13 is connected to a cam buckle member 14 formed of rigid material, such as plastic or metal. The preferred buckle member 14 is of unitary construction and has a pair of parallel side walls 21 and a top wall 22 to form a generally U-shaped cross section slightly wider than the belt width. The back end of the buckle 14 has a short bottom wall 23 and a parallel spaced rail member 24 extending transversely between the side walls 21. The top wall 22 extends angularly upward a distance from the open rear end forming a flat surface 25 and then angles downwardly a longer distance to the forward end defining a lever portion 26. A slot 27 extends transversely across the lever portion 26 near its intersection with the flat surface 25 and angularly inward a distance along the side walls 21.

As best seen in FIG. 4, the free end 13A of the belt 13 is passed beneath the bottom of the buckle 14 and then passed over the rail 24 and back beneath the bottom wall 23. The belt 13 can then be placed around the tree trunk T and the loop ring 20 and buckle 14 placed in close proximity to one another as seen in FIG. 3. The loop ring 20 is then placed into the slot 27. While holding the buckle and loop ring together in one hand, the free end 13A of the belt 13 may be pulled to remove any slack in the belt portion encircling the trunk. At this point, the brackets 12 are placed onto the belt 10 with their tangs 18 captured between the interior surface of the belt and the exterior surface of the tree trunk.

Once the brackets are positioned as desired, the lever portion 26 of the buckle 14 is cammed over as indicated by arrows in FIG. 4. As the lever portion 26 is pulled outward from the direction of the trunk T, the buckle 14 will pivot about the axis of the portion of the loop ring in the slot 27 causing the flat surface 25 to move toward the trunk. As this takes place, the two plys of the belt 13,13A beneath the bottom wall 23 at the rear of the buckle will be pressed together. Further movement of the lever portion 26 causes the rear portion of the buckle to roll over, acting as a cam, firmly gripping the two plys 13,13A of the belt together and drawing the looped end of the belt and loop ring together until the flat surface 25 is pressed against the trunk (FIG. 5). The angle of the slot 27 in the side walls 21 is such that when the buckle 14 is cammed over, the belt 13 is firmly tensioned around the trunk and the pulling force on the loop ring 20 at the bottom of the slot 27 is below the axis of opposed pulling force of the looped portion of the belt 13 to prevent the buckle from rolling back over the axis of the loop ring.

After the belt is firmly tensioned, the brackets 12 are firmly secured to the tree trunk or other vertical object and the shelf is installed, as described below. It should be noted, that with the present invention, no nails, screws, or other fasteners are driven into the surface of the tree or other vertical object, only the webbing belt is in direct contact with the exterior of the tree trunk or other vertical object, thus preventing damage to the surface. When it is desired to remove the belt and brackets, the lever portion of the buckle is pivoted back over in the opposite direction releasing the belt tension.

Figure 6:
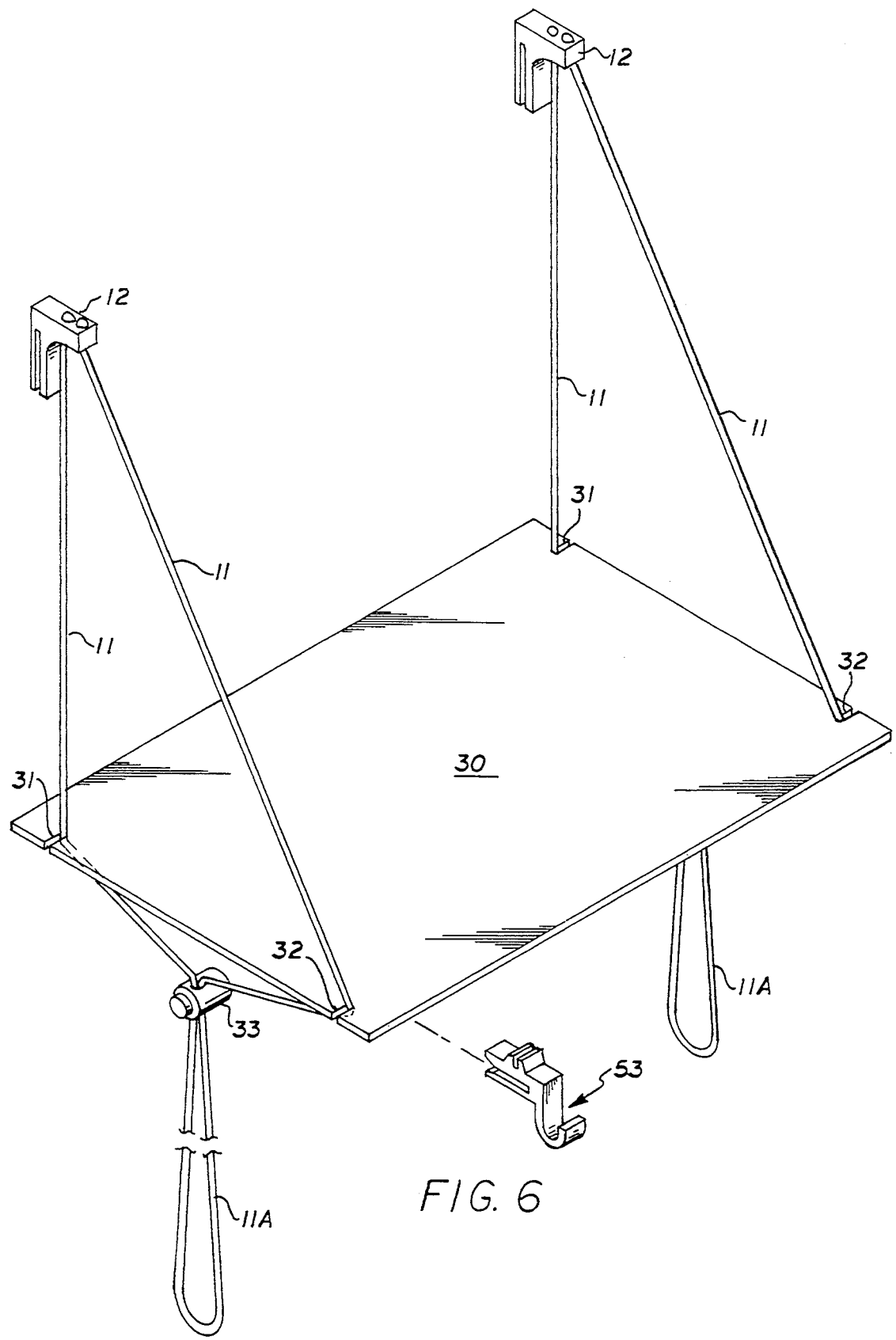
FIG. 6 is an isometric view of a single shelf suspended by a pair of cords attached to a pair of bracket members utilizing a cord lock.

Referring now to FIG. 6, a flat rectangular shelf 30 is installed in the loop portion 11A of the cords 11. In the preferred embodiment, the shelf 30 is sized to fit into a backpack to serve as a stiffener or divider when not being used as a shelf. The shelf 30 is a flat rectangular member and has a pair of slots 31 and 32 extending inwardly a short distance from the laterally opposed ends, one near each corner.

The shelf 30 is installed by holding it in a generally horizontal position at the approximate desired height and sliding opposite sides of the loop portion 11A of each cord 11 into the slots 31 and 32. The remaining portion of the loop portion of the cords 11 then hangs down beneath the shelf 30. In this embodiment, a spring loaded cord lock 33 is installed on the looped portion of the cords 11. While the cords 11 are loose, the shelf can then be manipulated to place it in a level horizontal position at the desired height. Once the shelf has been properly positioned, the cord lock 33 is moved upwardly near the underside of the shelf 30 and then released to hold the opposite sides of the cord 11 together. The looped path of the cord 11 through the slots 31 and 32 and the cord lock 33 prevent relative movement between the shelf and the cords. Once weight has been placed on the shelf, the cords are maintained tightly in the fastened configuration.

Figure 7:
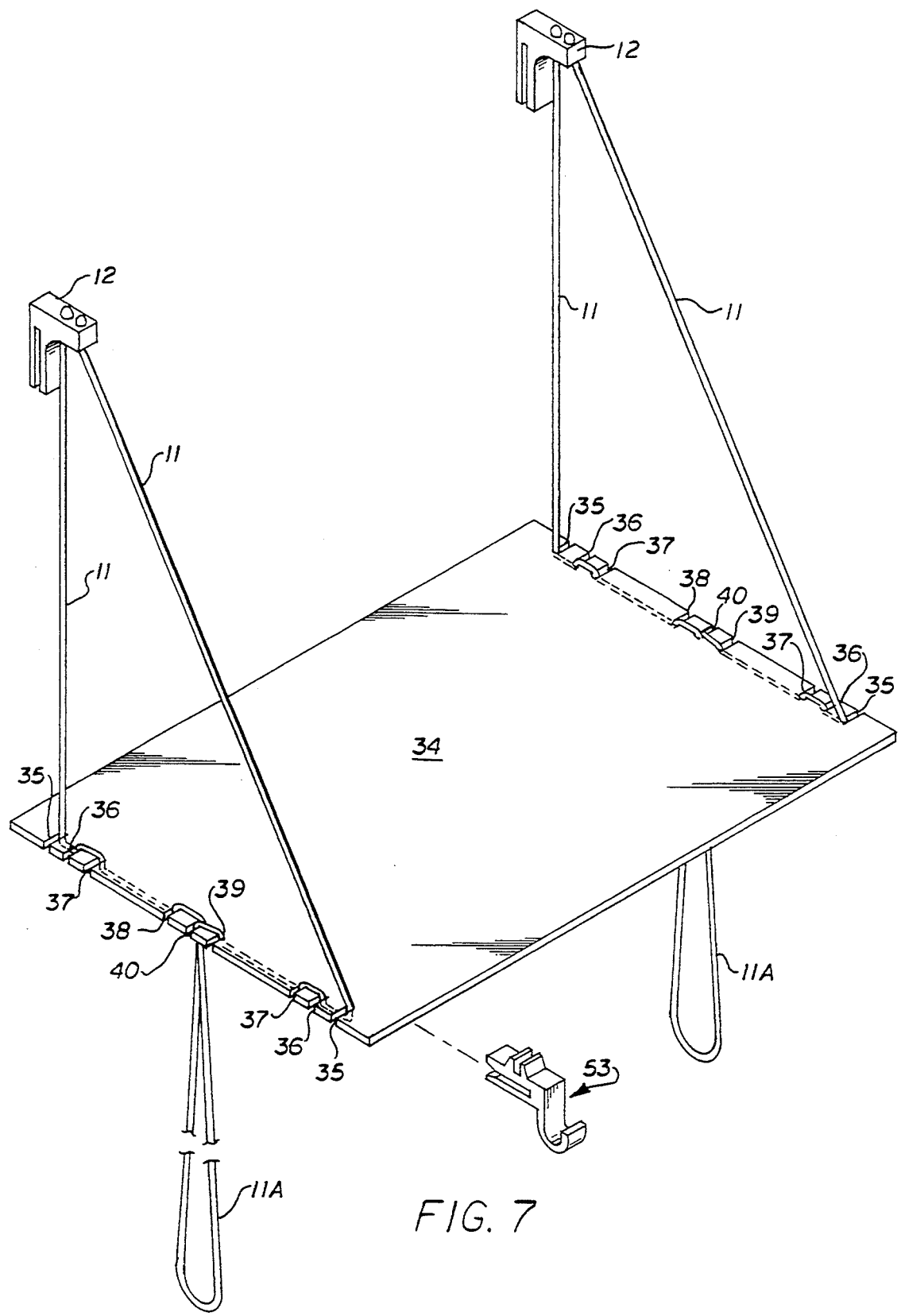
FIG. 7 is an isometric view of a single shelf suspended by a pair of cords attached to a pair of bracket members wherein the cords are passed through slots at the ends of the shelf member.

FIG. 7 shows another method of securing the shelf to the cords. In this embodiment, a flat rectangular shelf 34 has three slots 35, 36, and 37 extending inwardly a short distance from the laterally opposed ends near each corner, and three closely spaced slots 38, 39, and 40 extending inwardly a short distance from the laterally opposed ends midway between the outer slots 35, 36, and 37.

The shelf 34 is installed by holding it in a generally horizontal position at the approximate desired height and sliding opposite sides of the loop portion of each cord 11 into the outermost slots 35, underneath the shelf, upwardly through the next inwardly adjacent slots 36, over the top surface of the shelf, downwardly through the next inwardly adjacent slots 37, underneath the shelf, upwardly through the slots 38 and 39, and then downwardly through the center slot 40. The remaining portion 11A of the loop portion of the cords 11 then hangs down beneath the shelf. While the cords 11 are loose, the shelf can then be manipulated to place it in a level horizontal position at the desired height. Once the shelf has been properly positioned, the remaining portion of the loop portions are then pulled downwardly to tighten the cords 11. The serpentine looped path of the cords 11 through the slots prevent relative movement between the shelf and the cords. Once weight has been placed on the shelf, the cords are maintained tightly in the serpentine looped path.

Because the top ends of the cords are very close to the vertical object, when weight is placed on the shelf, the center of gravity of the shelf is spaced horizontally outward from its point of suspension and the resultant weight force is a vector which extends angularly downward and inward toward the vertical object (point of suspension), thus, the shelf has a natural tendency to press firmly inward against the vertical object. Under most conditions, the shelf will remain stable and resist lateral movement when supporting a weight. However, to further insure against lateral movement or swaying due to high winds, a weight may be tied to the portion of the cords which hangs down beneath the shelf, or the portion of the cords which hangs down beneath the shelf may be staked to the ground.

Figure 8:
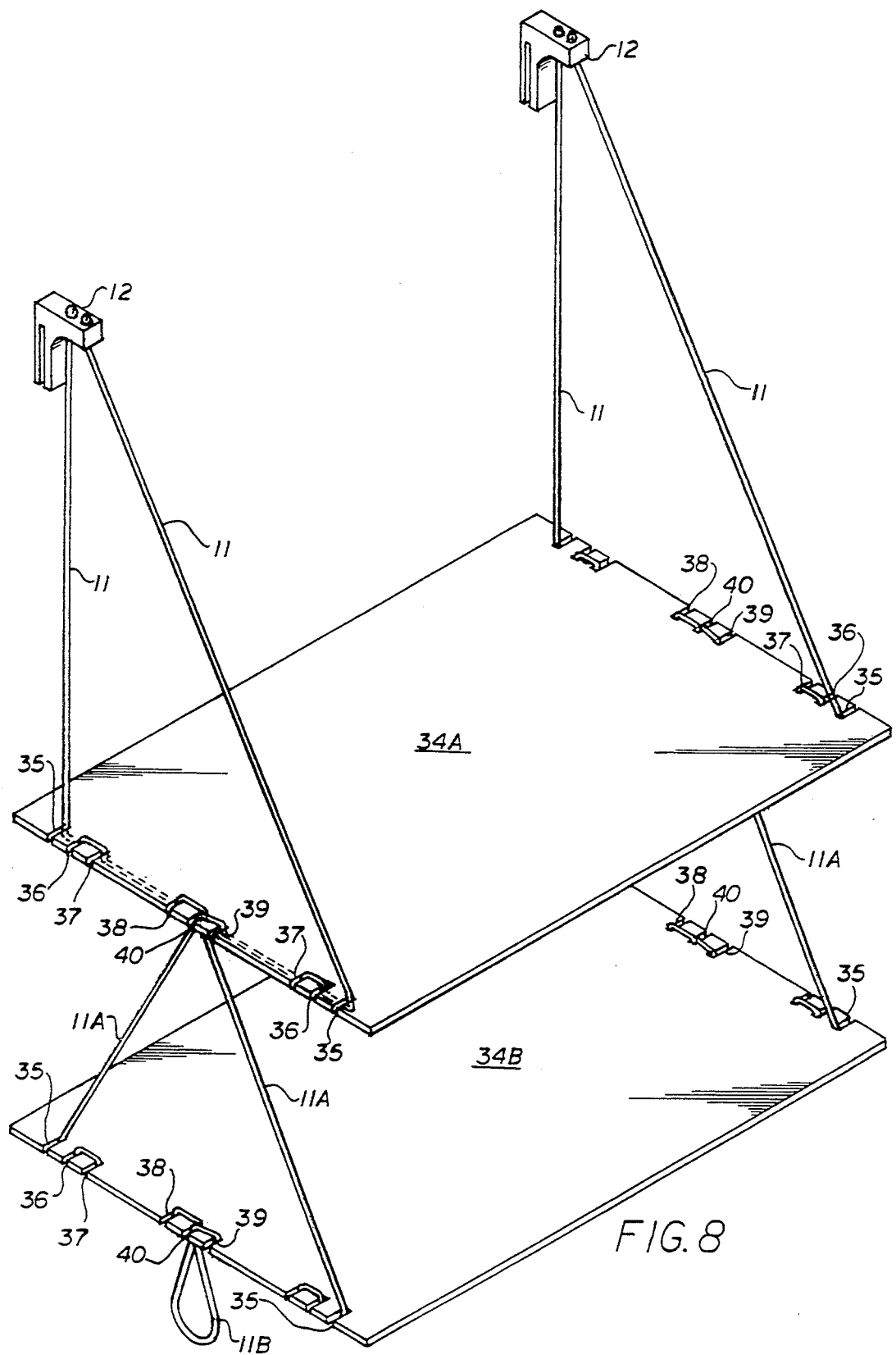
FIG. 8 is an isometric view of a pair of shelves suspended in vertically spaced relation by a pair of cords attached to a pair of bracket members.

FIG. 8 shows an installation utilizing two vertically spaced shelves 34A and 34B. The brackets 12, cords 11, and shelves 34A and 34B are configured as described previously, and given the same numerals of reference, but are not described in detail to avoid repetition. The upper shelf 34A is installed in the same manner described with reference to FIG. 7. In the two shelf installation, after the upper shelf 34A has been installed, the lower shelf 34B is installed in the loop portion 11A of the cords 11, which extends beneath the upper shelf 34A. The lower shelf 34B is installed by holding it in a generally horizontal position at the approximate desired height beneath the upper shelf and sliding opposite sides of the loop portion 11A of each cord 11 into the outermost slots 35, underneath the shelf, upwardly through the next inwardly adjacent slots 36, over the top surface of the shelf, downwardly through the next inwardly adjacent slots 37, underneath the shelf, upwardly through the slots 38 and 39, and then downwardly through the center slot 40. The remaining portion 11b of the loop portion 11A of the cords 11 then hangs down beneath the shelf. While the cords 11 are loose, both shelves can then be manipulated to place them in a level horizontal position at the desired height. Once both shelves have been properly positioned, the remaining portion of the loop portions are then pulled downwardly to tighten the cords 11. The serpentine looped path of the cords 11 through the slots prevent relative movement between the shelves and the cords.

In the example illustrated in FIG. 8, the slot arrangement of FIG. 7 is shown, but it should be understood that the cords may be fastened to the shelves using on one pair of slots and cord locks as described in FIG. 6.

The preferred shelf members may be formed of wood or plastic, and may be provided in various configurations. FIG. 9 shows a shelf member 41 having an open grid configuration 42 surrounded by a solid frame 43 which contains the slots 31 and 32 (or 35–40) for receiving the cord, as previously described. This embodiment is very lightweight and strong, and the open grid pattern allows air to pass therethrough to prevent movement or swaying due to strong winds.

FIG. 10 shows another embodiment of a shelf member 45 which has a central opening 46 surrounded by a solid frame 47 which contains the slots 31 and 32 (or 35–40) for receiving the cords, as previously described. As shown in FIG. 10, a wash basin 48 or other vessel having a radial flange 49 at its top end may be placed into the central opening 46 and supported on the frame 47 surrounding the central opening. In some instances, another suitable container may be placed into the aperture, such as a pot, pan, bowl, etc.

Figure 11:
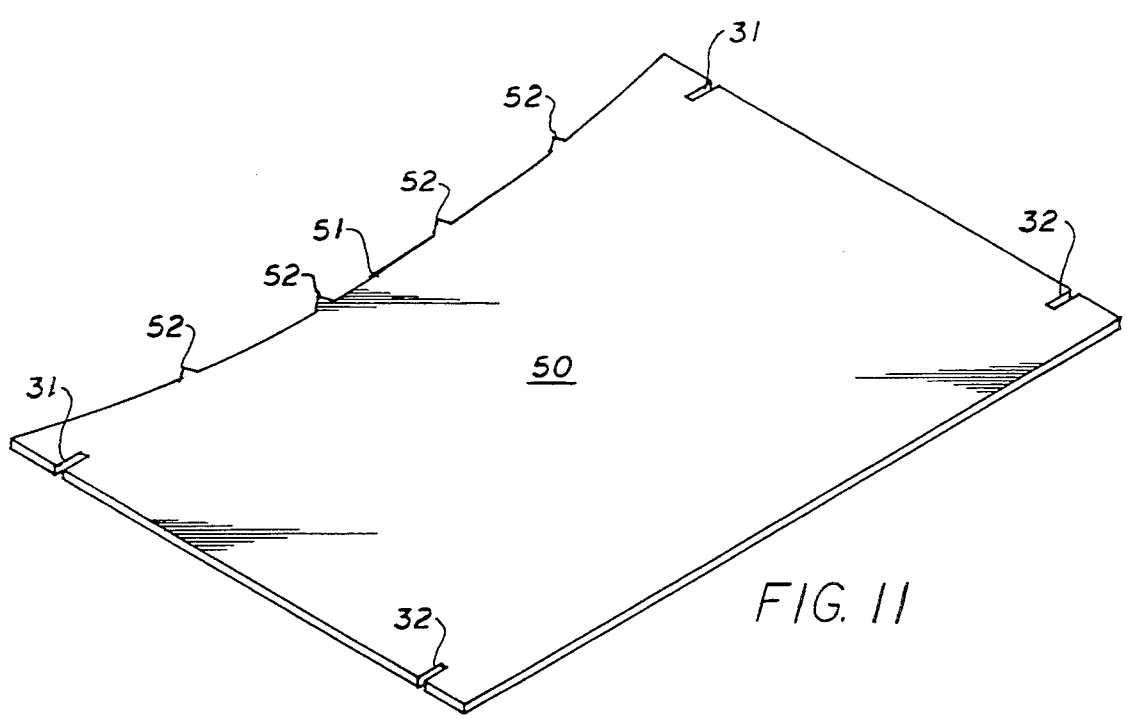
FIG. 11 is an isometric view of another embodiment of a shelf member having a curved side.

FIG. 11 shows another embodiment of a shelf member 50 which has longitudinal side 51 slightly curved to more closely fit the contour of the tree or other vertical object, and may also be provided with outwardly extending protuberances 52 to engage the surface of the vertical object to prevent lateral movement or swaying due to high winds.

Figure 12:
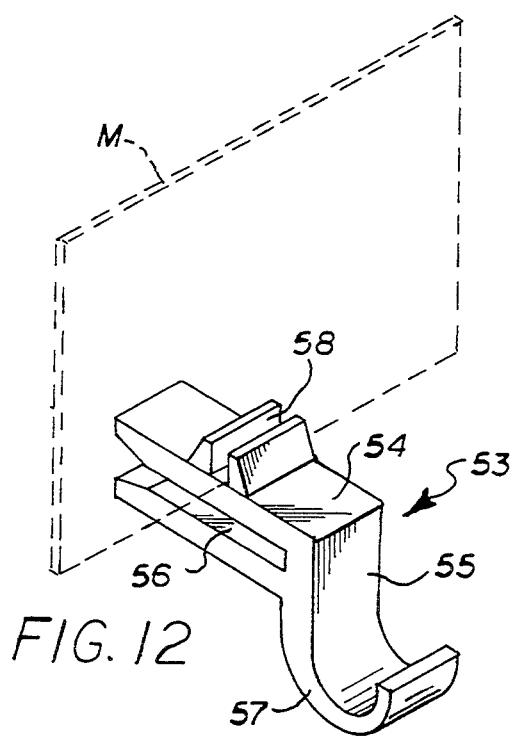
FIG. 12 is an isometric view of a bracket member which can be attached to the shelves for holding other articles.

Referring again to FIGS. 6 and 7, and to FIG. 12, there is shown a bracket 53 which may be used with the portable hanging shelf. The bracket 53 is a generally rectangular member having a horizontal portion 54 with a vertical portion 55 at one end. A slot 56 extends inwardly from one end of the bracket and terminates near the vertical end 55. The width of the slot 56 is sufficient to receive and frictionally engage the outer edge of the shelf when the bracket is pressed onto the shelf. The vertical portion 55 of the bracket 53 extends downwardly a distance and then curves upwardly to define a J-shaped hook 57. Various articles may be hung from the hook 57. A slot 58 extends transversely across a small extension on the top surface of the horizontal portion 54 of the bracket 53. A thin flat mirror M may be frictionally engaged in the slot 58. The bracket 53 is particularly useful when shaving or washing.

When not in use, the belt 13 and buckle 14 may be folded or rolled into a compact configuration, and the brackets 12 may be placed together and the cords 11 wound around them to form a compact configuration which will easily fit in a small space such as the pocket of a backpack. The shelf or shelves may be placed into the backpack to serve as a stiffener or divider, such that all of the components of the shelf system may be stored in a backpack or other small space and easily transported.

While this invention has been described fully and completely with special emphasis upon a preferred embodiment, it should be understood that within the scope of the appended claims the invention may be practiced otherwise than as specifically described herein.

I claim:

1. A portable hanging shelf system for supporting articles from generally vertical objects of varying diameters without nails or screws comprising;

a non-elastic flexible fabric belt having an inner and outer surface and of sufficient length to encircle an exterior surface of generally vertical objects of varying diameters, adjustable fastener means on said belt to releasably grip and apply tension in the encircled portion of said belt and firmly secure said belt in the encircled condition, a pair of bracket members each having a generally vertical surface received between the exterior surface of the generally vertical object and the inner surface of said belt when said belt is in an encircled unfastened condition and each said bracket member being tightly gripped and rigidly secured between the exterior surface of the generally vertical object and the inner surface of said belt to prevent relative movement therebetween when said belt is firmly secured in an encircled and fastened condition, a flexible cord member connected with each said bracket member and each having a looped portion extending downwardly therefrom, and a generally flat planar shelf removably connected with each said cord member looped portion to be suspended thereby in a generally horizontal position and supported by said bracket members.

2. A portable hanging shelf system according to claim 1 in which said adjustable fastener means comprises a rigid loop member secured on one end of said belt, an adjustable lever-type cam buckle member installed on said belt having a pivotal lever portion configured to grip said belt and to releasably engage said loop member and draw said loop member and the gripped portion of said belt toward one another to apply tension in the encircled portion of said belt and bias said lever portion in a fastened condition to firmly secure said belt in the encircled condition.

3. The portable hanging shelf system according to claim 2 in which said adjustable lever-type cam buckle member is configured such that in the engaged and fastened condition at least one ply of the belt material is disposed between said buckle and the exterior surface of the generally vertical object and no portion of said buckle is in direct contact with the exterior surface of the generally vertical object to prevent damage to the exterior surface of the generally vertical object by said buckle.

4. A portable hanging shelf system according to claim 1 in which each said bracket member has a generally vertical flat tang portion slidably and removably received between the exterior surface of the generally vertical object and the inner surface of said belt by vertical insertion or removal when said belt is in an encircled unfastened condition.

5. A portable hanging shelf system according to claim 1 in which each said bracket member has an upper portion perpendicular to said generally vertical surface, and each said flexible cord member has two ends secured to said bracket member upper portion and a looped portion extending downwardly therefrom.

6. A portable hanging shelf system according to claim 1 in which each said bracket member has an upper portion perpendicular to said generally vertical surface, each said flexible cord member has two ends secured to said bracket member upper portion and a looped portion extending downwardly therefrom, an adjustable cord fastening means on each said looped portion said generally flat planar shelf is apertured to receive said looped portion of each said flexible cord member and is releasably secured thereto by said adjustable cord fastening means.

7. A portable hanging shelf system according to claim 6 in which there are two said flat planar shelves and two adjustable cord fastener members on each said looped portion, a first one of said adjustable cord fastening means being positioned beneath a first one of said shelves and a second one of said adjustable cord fastening means being position beneath a second one of said shelves, whereby said shelves are suspended in horizontal vertically spaced relation.

8. A portable hanging shelf system according to claim 6 in which said adjustable cord fastening means is a spring cord lock device for fastening opposite sides of each said looped portion together beneath said shelf.

9. A portable hanging shelf system according to claim 1 in which each said bracket member has an upper portion perpendicular to said generally vertical surface, each said flexible cord member has two ends secured to said bracket member upper portion and a looped portion extending downwardly therefrom, and said generally flat planar shelf is provided with slots on opposite ends to receive said looped portion of each said flexible cord member and is releasably secured thereto by securing said flexible cord looped portions into said slots.

10. A portable hanging shelf system according to claim 9 in which said generally flat planar shelf is provided with a plurality of parallel slots on opposite ends and said looped portion of each said flexible cord member and is passed through said slots in a serpentine path to secure said shelf thereto.

11. A portable hanging shelf system according to claim 10 in which there are two said flat planar shelves provided with a plurality of parallel slots on opposite ends, said looped portion of each said flexible cord member is passed through said slots of a first one of said shelves in a serpentine path to secure said shelf thereto, and the remaining looped portion of each said flexible cord member is passed through said slots of a second one of said shelves in a serpentine path, whereby said shelves are suspended in horizontal vertically spaced relation.

12. A portable hanging shelf system according to claim 1 in which said generally flat planar shelf has an open grid configuration surrounded by a solid frame which is apertured to receive said looped portions of each said flexible cord member.

13. A portable hanging shelf system according to claim 1 in which said generally flat planar shelf has a central opening surrounded by a solid frame which is apertured to receive said looped portions of each said flexible cord member.

14. A portable hanging shelf system according to claim 13 including a vessel shaped to fit within said central opening.

15. A portable hanging shelf system according to claim 11 in which said generally flat planar shelf has a curved longitudinal side edge to generally fit the contour of the generally vertical object on which it is suspended.

16. A portable hanging shelf system according to claim 1 including a second bracket adapted to be removably attached to said shelf for receiving and supporting various articles.

* * * * *